(12) United States Patent
Ruppel et al.

(10) Patent No.: US 11,892,319 B2
(45) Date of Patent: Feb. 6, 2024

(54) SYSTEM AND METHOD FOR SELF-TEST OF INERTIAL MEASUREMENT UNIT (IMU)

(71) Applicant: Aptiv Technologies Limited, St. Michael (BB)

(72) Inventors: Christopher David Ruppel, Carmel, IN (US); David Jerold Imboden, Kokomo, IN (US); Jerry Keith Fennell, Sharpsville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 2 days.

(21) Appl. No.: 17/405,632

(22) Filed: Aug. 18, 2021

(65) Prior Publication Data
US 2022/0057234 A1    Feb. 24, 2022

Related U.S. Application Data

(60) Provisional application No. 63/067,392, filed on Aug. 19, 2020.

(51) Int. Cl.
| | |
|---|---|
| *G01C 25/00* | (2006.01) |
| *B60T 8/172* | (2006.01) |
| *B60W 40/11* | (2012.01) |
| *B60W 40/112* | (2012.01) |
| *B60W 40/114* | (2012.01) |
| *B60W 10/22* | (2006.01) |

(52) U.S. Cl.
CPC ............ *G01C 25/005* (2013.01); *B60T 8/172* (2013.01); *B60W 40/11* (2013.01); *B60W 40/112* (2013.01); *B60W 40/114* (2013.01); *B60W 10/22* (2013.01)

(58) Field of Classification Search
CPC .... G01C 25/005; G01C 25/00; G01C 21/183; B60T 8/172; B60W 40/11; B60W 40/112; B60W 40/114; B60W 10/22
See application file for complete search history.

(56) References Cited

U.S. PATENT DOCUMENTS

| | | | |
|---|---|---|---|
| 6,298,318 B1 * | 10/2001 | Lin .................. | G01C 21/16 |
| | | | 434/30 |
| 7,729,829 B2 | 6/2010 | Messih et al. | |
| 8,538,008 B2 | 9/2013 | Suppappola | |

(Continued)

FOREIGN PATENT DOCUMENTS

| | | | | |
|---|---|---|---|---|
| CN | 102648394 B | 12/2015 | | |
| DE | 102012022512 A1 * | 5/2014 | ........... | G01C 25/005 |

(Continued)

OTHER PUBLICATIONS

DE-102012022512-A1 translation (Year: 2014).*

(Continued)

*Primary Examiner* — Jeff A Burke
*Assistant Examiner* — Kyle T Johnson
(74) *Attorney, Agent, or Firm* — Billion & Armitage

(57) ABSTRACT

An inertial measurement unit (IMU) self-test system includes an IMU and a control circuit. The control circuit is configured to receive IMU data collected by the IMU and inputs from systems external to the IMU indicative of mechanical stimulus, wherein the control circuit utilizes IMU data collected in response to the mechanical stimulus to determine IMU validity.

20 Claims, 5 Drawing Sheets

(56) References Cited

U.S. PATENT DOCUMENTS

| | | | |
|---|---|---|---|
| 9,151,613 B2 | 10/2015 | Czompo et al. | |
| 9,752,879 B2 * | 9/2017 | Al-Hamad | G01C 21/16 |
| 2005/0268716 A1 | 12/2005 | Hrovat et al. | |
| 2010/0211249 A1 | 8/2010 | McClellan | |
| 2013/0233048 A1 * | 9/2013 | Anac | G01C 19/56 |
| | | | 73/1.77 |
| 2015/0143913 A1 * | 5/2015 | Adams | G06V 20/52 |
| | | | 382/104 |
| 2018/0178797 A1 * | 6/2018 | Seaman | B60W 10/30 |
| 2018/0321038 A1 * | 11/2018 | Liukku | G01C 25/005 |
| 2020/0011702 A1 * | 1/2020 | Clark | G01C 19/56 |
| 2020/0132567 A1 * | 4/2020 | Wheeler | G06F 17/142 |

FOREIGN PATENT DOCUMENTS

| | | | | |
|---|---|---|---|---|
| DE | 102012022512 B4 | 1/2018 | | |
| GB | 2542937 A | * | 4/2017 | B60K 35/00 |
| GB | 2542937 A | | 5/2017 | |
| WO | 2015035496 A1 | | 3/2015 | |

OTHER PUBLICATIONS

Extended European Search Report for EP Application No. 21191430. 4, dated Jan. 10, 2022, 9 pages.
"Chinese Non-Final Office Action dated Aug. 30, 2023", 7 Pages.

* cited by examiner

SYSTEM AND METHOD FOR SELF-TEST OF INERTIAL MEASUREMENT UNIT (IMU)

CROSS-REFERENCE TO RELATED APPLICATION(S)

This application claims the benefit of U.S. Provisional Patent Application No. 63/067,392 filed Aug. 19, 2020, titled "SYSTEM AND METHOD FOR SELF-TEST OF INERTIAL MEASUREMENT UNIT (IMU)", which is incorporated by reference herein in its entirety.

FIELD

The present invention relates generally to self-test systems and in particular to self-test systems for inertial measurement units (IMUs) located on vehicles.

BACKGROUND

Vehicles commonly employ inertial measurement units that includes one or more accelerometers and/or gyroscopes for determining the speed, orientation, and/or position of the vehicle. IMU data may be utilized in a variety of applications, including for self-driving vehicles. For example, the IMU data may be utilized to provide a dead reckoning position estimate of the vehicle (for example, if GPS positioning is not available or is providing faulty data).

Typically, the IMU is securely mounted within a vehicle, wherein the orientation of the IMU is extrapolated to the orientation of the vehicle. It would be desirable to provide a system and method of detecting a faulty IMU—a self-test capability.

SUMMARY

According to one aspect, a method of testing an inertial measurement unit (IMU) includes detecting a mechanical stimulation event generated external to the IMU. The method further includes receiving IMU data from the IMU that includes IMU data collected with respect to the mechanical stimulation event and determining IMU validity based on IMU data recorded in response to the mechanical stimulation event.

According to another aspect, an active method of testing an inertial measurement unit (IMU) includes initiating a mechanical stimulus. The method further includes receiving collected IMU data that includes IMU data collected during the mechanical stimulus and determining IMU validity based on the IMU data collected during the mechanical stimulus.

According to another aspect, an inertial measurement unit (IMU) self-test system includes an IMU and a control circuit. In some embodiments the control circuit is configured to receive IMU data collected by the IMU and inputs from systems external to the IMU indicative of mechanical stimulus. The control circuit utilizes IMU data collected in response to the mechanical stimulus to determine IMU validity.

DETAILED DESCRIPTION

According to some aspects, the present disclosure provides a system and method self-testing an inertial measurement unit (IMU) based on stimulus events occurring external to the IMU. The IMU self-test may be utilized to verify the mounting integrity and orientation of the IMU. In some embodiments, no additional or new hardware is required to generate the stimulus event—rather, events occurring as a part of normal vehicle operation are utilized as stimulus events. For example, the opening/closing of a door, starting of the engine, etc., may be utilized as the stimulus event. In other embodiments, stimulus events may be initiated by the system, such as activation of vehicle speakers or active suspension.

Figure 1:
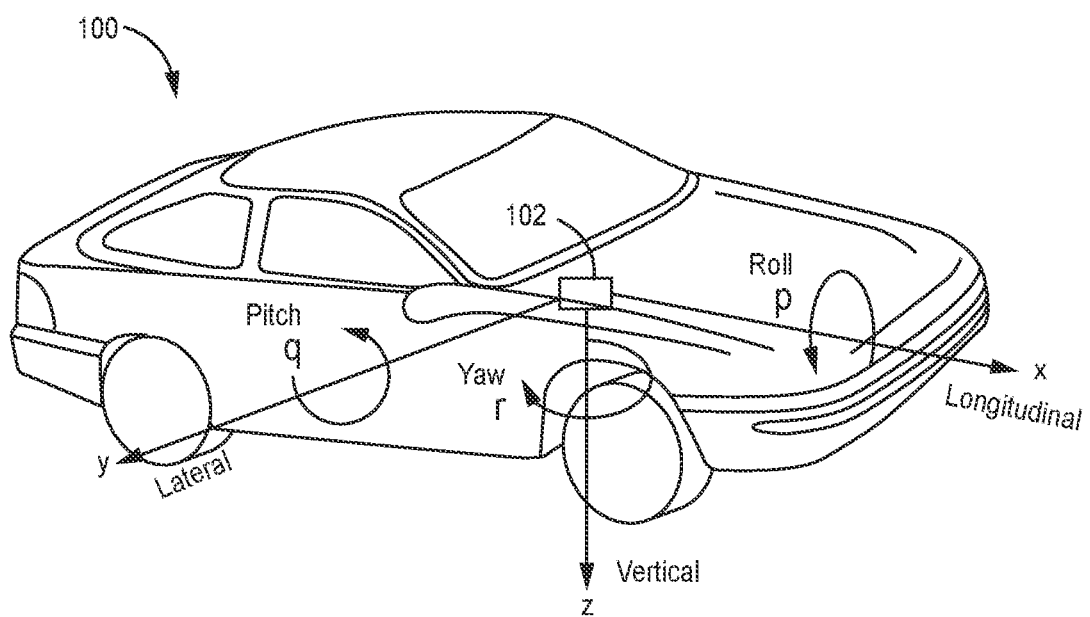
FIG. 1 is an isometric view of a vehicle and associated xyz reference frame, and roll-pitch-yaw (RPY) reference frame.

FIG. 1 is an isometric view of a vehicle 100 and associated xyz reference frame, and roll-pitch-yaw (RPY) reference frame. In some embodiments, an IMU 102 is mounted on the vehicle 100. In some embodiments, IMU 102 is an electronic device that measures and reports a body's specific force, angular rate, and/or the orientation of the body, using a combination of accelerometers, gyroscopes, and/or magnetometers. In some embodiments, IMU 102 works by detecting linear acceleration using one or more accelerometers and rotational rate using one or more gyroscopes. Linear acceleration is defined along the longitudinal, lateral, and vertical axis (x, y, and z) as shown in FIG. 1. Rotation rate is defined along the same three axes and is referred to as roll, pitch and yaw (p, q, and r) as shown in FIG. 1. In some embodiments, IMU 102 may include one accelerometer, gyro, and magnetometer per axis for each of the three principal axes: pitch, roll and yaw.

In some embodiments, IMU 102 is rigidly mounted to the vehicle such that acceleration and rotational forces sensed by the IMU 102 correspond with acceleration and rotational forces experienced by the vehicle 100. In the event the IMU 102 becomes disconnected (i.e., non-rigidly) affixed to the vehicle, then IMU data collected by the IMU will not correspond with the actual acceleration/rotational forces associated with the vehicle 100. In some embodiments, a validity check of the IMU 102 tests whether forces experienced by the vehicle 100 correspond with the forces measured by the IMU 102. In addition, the orientation of the IMU must be referenced to the orientation of the vehicle. That is, a force interpreted by the IMU 102 as longitudinal in the positive x direction should correspond with a force on the vehicle 100 in the positive x direction. In some embodiments, a validity check includes verifying the orientation of the IMU 102 relative to the vehicle.

As described in more detail below, in some embodiments an IMU self-test is conducted by utilizing a stimulus event (i.e., mechanical perturbation) that originates external to the IMU 102—but measurable by the IMU 102—to verify the validity of IMU data. In some embodiments, this includes one or both of determining that the IMU 102 is properly affixed (i.e., mounting integrity) and/or determining that the IMU 102 is oriented properly with respect to the vehicle. The stimulus event utilized by the IMU self-test system may include stimulus initiated by the IMU self-test system (referred to herein as active stimulus) or stimulus occurring without input from the IMU self-test system but utilized by the IMU self-test system nonetheless (referred to herein as passive stimulus). For example, active stimulus events initiated by the IMU self-test system may include generating an audio signal via one or more speakers that is detectable by the IMU 102 and/or activating a vehicle's active suspension system to create a mechanical stimulus detectable by the IMU 102. Examples of passive stimulus events utilized without initiation by the IMU self-test system may include doors opening/closing, engine start, trunk opening/closing, or other events that result in mechanical perturbation detectable by the IMU 102. In some embodiments, regardless of whether the stimulus event is actively or passively initiated, the origin of the stimulus event is utilized to determine the expected IMU response. For example, a passenger-side door being opened/closed provides a mechanical stimulus (e.g., acceleration in the negative y-direction) that differs from the drive-side door being opened/closed (e.g., acceleration in the positive y-direction), each of which causes a different IMU response. In some embodiments, the origin of the stimulus event can be utilized to verify the orientation of the IMU. Opening/closing of the driver-side door resulting in an IMU signal corresponding with acceleration in the negative y-direction may be indicative of a fault in the orientation of the IMU (installed backwards, for example). In this way, the IMU self-test system may be utilized to validate one or both of IMU mounting integrity and IMU orientation.

Figure 2:
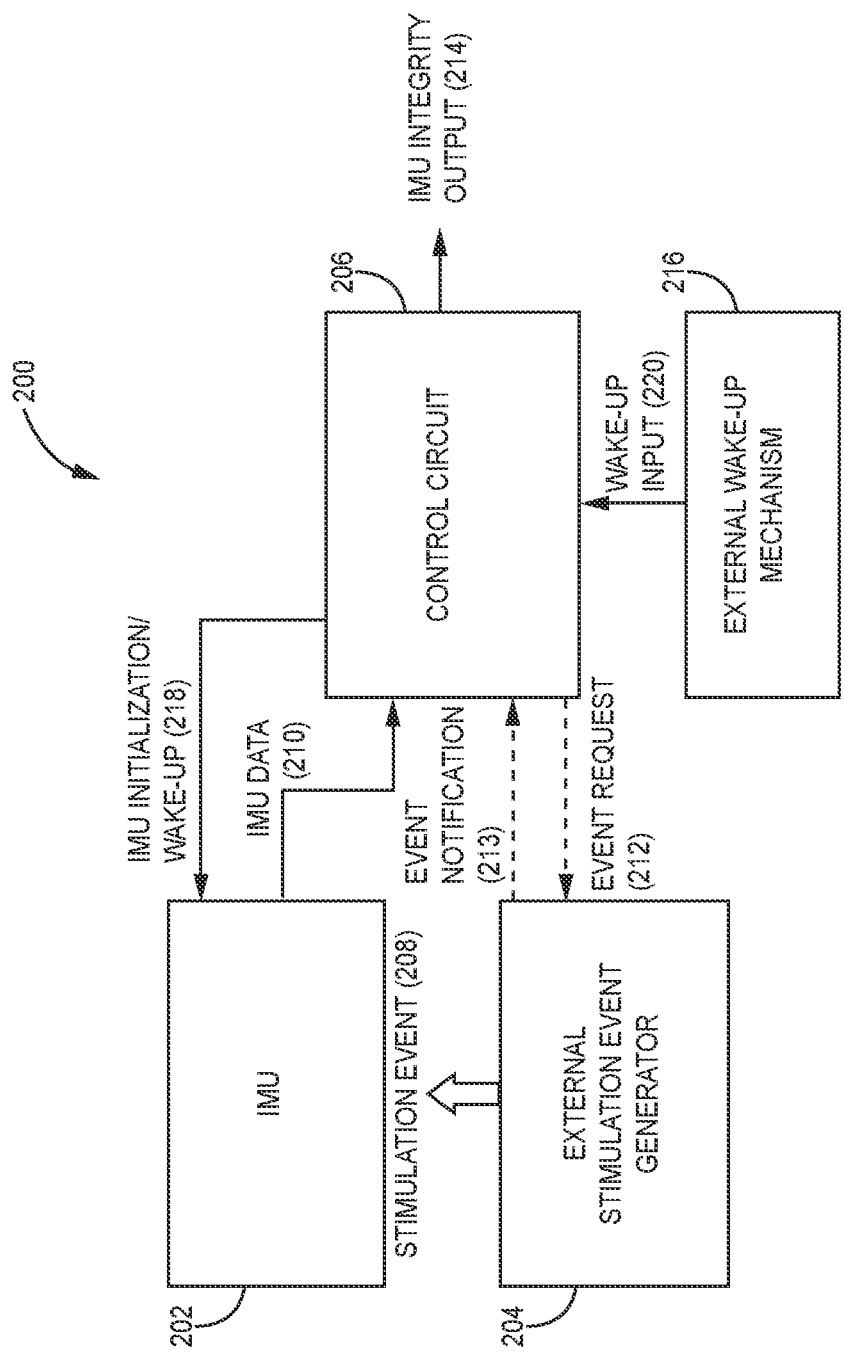
FIG. 2 is a block diagram of an IMU self-test system according to some embodiments.

FIG. 2 is a block diagram of an IMU self-test system 200 according to some embodiments. In some embodiments, IMU self-test system 200 includes IMU 202 and control circuit 206. IMU data 210 collected by the IMU 202 is communicated to control circuit 206 for analysis to determine IMU validity. In some embodiments, IMU validity includes one or both of IMU mounting integrity and IMU orientation integrity, wherein IMU mounting integrity refers to the physical connection of the IMU 202 to the vehicle and IMU orientation integrity refers to the orientation of the IMU 202 relative to the vehicle. In some embodiments, the vehicle may include a single IMU or a plurality of IMUs.

The IMU self-test relies on stimulus events 208 generated by a system external to the IMU 202, referred to herein as external stimulation generator 204. In some embodiments, the external stimulation generator 204 may include vehicle doors being opened/closed, engine start, speakers, trunk/hatch being opened/closed, active suspension, or other components of the vehicle capable of generating a mechanical stimulation event 208 detectable by the IMU 202. In some embodiments, the external stimulation generator 204 communicates with control circuit 206. In some embodiments, this may include receiving event initiation requests 212 from control circuit 206 instructing the external stimulation generator 204 to initiate a stimulation event 208 (i.e., actively initiated IMU self-test) such as initiating speaker output or activating the active suspension. In other embodiments, control circuit 206 may receive an event notification 213 from the external stimulation generator 204 notifying the control circuit 206 of the occurrence or impending occurrence of a stimulation event 208. For example, having sensed a driver-side door being opened, an event notification 213 may be communicated to the control circuit 206 regarding the door open event and may further provide information that it was the driver-side door that was opened. IMU data 210 collected during the driver-side door open event may be utilized to determine IMU validity. In some embodiments, having sensed that the driver-side door has been opened, an event notification 213 may be communicated to the control circuit 206 regarding the impending likelihood of a door close event. In some embodiments, in response to the received event notification 213 identifying the driver-side door open event, the control circuit 206 initiates an IMU initialization/wake-up message 218 to the IMU 202 to begin collecting IMU data in anticipation of the door close event. In some embodiments, the IMU initialization/wake-up message 218 instructs the IMU 202 to begin collecting IMU data. In some embodiments, the IMU initialization/wake-up message 218 is utilized to configure the IMU 202 for conducting the IMU self-test. For example, in some embodiments the IMU 202 may be configured by the IMU initialization/wake-up message 218 to collect IMU data with a modified response gain or bandwidth (e.g., increased gain and/or increased bandwidth) for the duration of the self-test. In some embodiments, this may provide more accurate results in determining validity of the IMU 202. In some embodiments, external stimulation generator 204 generates an event notification 213 in response to the driver-side door close event that is communicated to the control circuit 206. In some embodiments, the event notification 213 may include a time-stamp identifying when the driver-side door was closed. In response, control circuit 206 analyzes IMU data collected during the door close event to determine IMU validity.

In some embodiments, external wake-up mechanism 216 communicates with control circuit 206, providing inputs 220 notifying control circuit 206 of upcoming stimulation events. For example, in some embodiments the external wake-up mechanism 216 is a key fob utilized by the user to unlock the vehicle from a distance. In some embodiments, the key fob is automatically detected by the control circuit 206 when in range. In other embodiments, the control circuit 206 receives an input 220 from the key fob when the user utilizes the key fob to unlock the vehicle. In some embodiments, the signal received from the external wake-up mechanism 216 (e.g., key fob) indicates a high probability of an upcoming stimulation event 208, such as a door being opened/closed or the engine starting. In some embodiments, in response to an input 220 received from the external wake-up mechanism 216 the control circuit 206 generates an IMU initialization/wake-up message 218 provided to IMU 202 to initiate the collection of IMU data 210. As discussed above, in some embodiments the IMU initialization/wake-up message 218 is utilized to start recording IMU data 210. In other embodiments, the IMU initialization/wake-up message 218 is utilized to initialize the IMU 202, which may include modifying the response gain and/or bandwidth associated with the collection of the IMU data 210.

In response to IMU data 210 collected from IMU 202 during a stimulation event, control circuit 206 determines IMU validity and generates an IMU validity output 214. In some embodiments the determination made by control circuit 206 is based only on the collected IMU data 210. In other embodiments, control circuit 206 combines the collected IMU data 210 with other inputs to determine IMU validity. In some embodiments, event notification 213 received from external stimulation event generator 204 identifying the type of mechanical stimulus being generated (e.g., passenger door open/close) and/or the timing associated with the stimulation event 208 (e.g., timestamp identifying when the passenger door was opened/closed) may be utilized in combination with the collected IMU data to determine IMU validity. For example, inputs identifying that the stimulation event 208 was generated by the passenger-side door being opened and/or closed may be utilized in combination with the collected IMU data 210 to determine IMU validity. In the event control circuit 206 determines that the collected IMU data 210 reflects the expected response to the passenger-side door being opened and/or closed, then the control circuit 206 confirms the IMU validity—which may include both IMU mounting integrity and IMU orientation. If the control circuit 206 determines that the collected IMU data 210 does not reflect the expected response to the passenger-side door being opened and/or closed—either due to improper mounting and or improper orientation—the control circuit 206 generates an IMU validity output 214 that indicates the detection of a fault state. In some embodiments, an indication that the IMU is faulty may be communicated to the user via a display or error warning. In some embodiments, a determination that the IMU is faulty may also be communicated to downstream system utilizing IMU data.

In some embodiments, the determination of whether collected IMU data 210 reflects the expected response to a stimulation event 208 is based on a comparison of the collected IMU data 210 to reference IMU data representing the expected IMU response. In some embodiments, control circuit 206 stores a plurality of expected IMU response profiles, each corresponding to possible stimulation events 208. For example, one expected IMU response may correspond with opening the passenger-side door and another may correspond with closing the passenger-side door. That is, each stimulus event 208 utilized by the IMU self-test system may correspond with an expected IMU response. In some embodiments, control circuit 206 receives inputs identifying the stimulation event, wherein the control circuit compares collected IMU data to the expected IMU response corresponding with the identified stimulation event. In some embodiments, control circuit 206 may utilize the identified stimulation event 208 to update or modify the expected IMU response. For example, the control circuit 206 may update the expected IMU response based on the typical manner in which the user closes a door. In some embodiments, updating or modifying the expected IMU response may utilize a neural network (i.e., artificial intelligence) to learn the expected IMU response for a particular vehicle and/or particular user (e.g., a user that slams doors versus a user that closes doors gently). In some embodiments, additional inputs may be received from other systems, which may be utilized to modify the expected IMU response profile. For example, control circuit 206 may modify an expected IMU response profile based on an input received from a seat-occupancy detection sensor indicating that a passenger is seated within the vehicle (assuming the presence of a passenger modifies the expected IMU response). In this way, the control circuit 206 may fuse one or more sensor inputs in order to select the expected IMU response profile.

Figure 3:
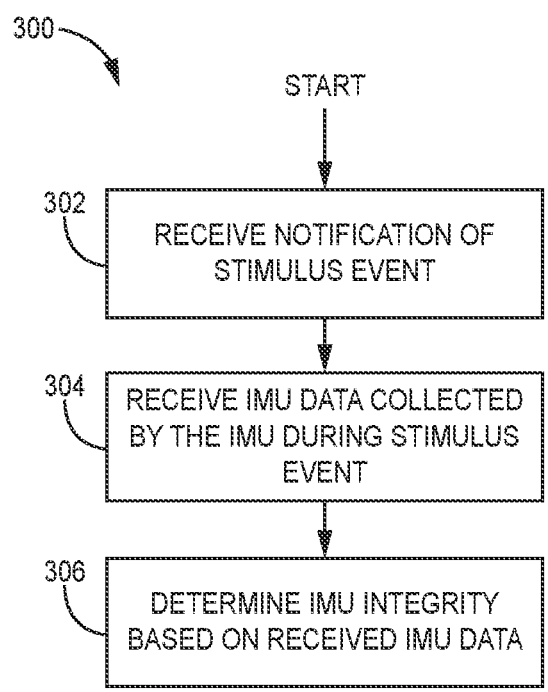
FIG. 3 is a flowchart illustrating a method of conducting an IMU self-test according to some embodiments.

FIG. 3 is a flowchart illustrating a method of conducting an IMU self-test according to some embodiments. At step 302, a notification is received of the stimulus event. In some embodiments the notification is generated and communicated at approximately the same time that the stimulus event is generated. For example, in some embodiments a door sensor may indicate that a door has been opened and may initiate communication with the control circuit regarding the stimulus event. In order to utilize the door opening event the IMU will need to be collecting IMU data and communicating collected IMU data to the control circuit prior to knowledge of the stimulus event. In other embodiments, the received notification is provided with respect to an impending stimulus event. For example, a door sensor may provide a notification that a door has been opened. In this example, the door open event is not utilized as the stimulus event, but the indication that a door has been opened is utilized as notification regarding an impending door close event. In other embodiments, input received from a key fob may be utilized as notification of an impending stimulus event (e.g., door opening/closing, engine start, etc.).

At step 304, IMU data collected by the IMU during the stimulus event is received. In some embodiments, the control circuit communicates a wake-up message to the IMU in response to the notification of impending stimulus event received at step 302. In other embodiments, the IMU is configured to continually collect IMU data and so no notification or wake-up message is required.

At step 306, IMU validity is determined on the received IMU data. In some embodiments, the IMU data alone is sufficient to make some determinations regarding IMU validity. For example, the fact that the IMU detects a stimulus event may indicate that the IMU is working properly—at least to some extent. In some embodiments, IMU validity is determined based on a combination of IMU data and information regarding the stimulus event. For example, the type of stimulus event (e.g., door open, door close, engine start, etc.) may be utilized in combination with the received IMU data to determine IMU validity. That is, a door close event (more specifically, a driver-side door close event) is expected to generate a particular IMU response. IMU validity may be determined by comparing the collected IMU data with the expected IMU response, wherein the expected IMU data is based on knowledge of the stimulus event.

Figure 4:
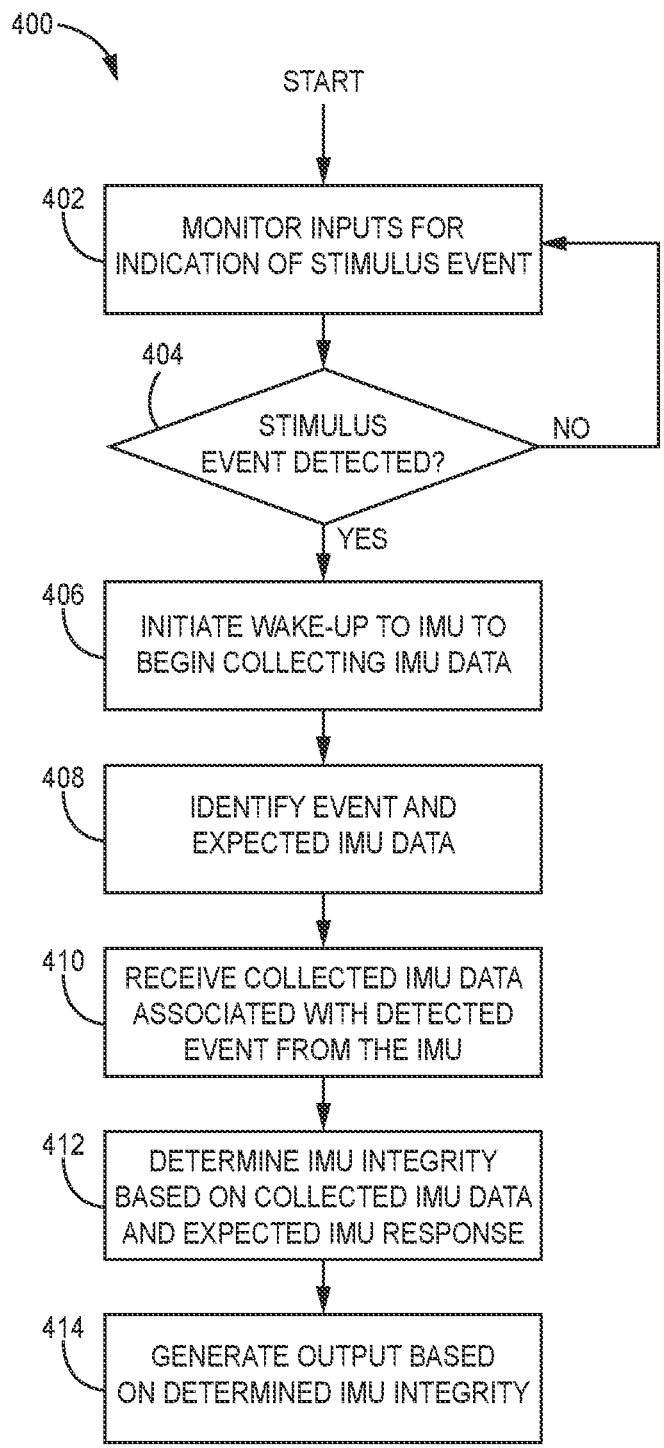
FIG. 4 is a flowchart illustrating a method of conducting a passive IMU self-test according to some embodiments.

FIG. 4 is a flowchart illustrating a method 400 of conducting a passive IMU self-test according to some embodiments. At step 402 the control circuit monitors inputs for an indication of an upcoming stimulus event. In some embodiments, this may include receiving inputs from an external system like a key fob indicating that the doors have been unlocked and door open/close events are likely impending. In other embodiments, other inputs may be utilized, such as the vehicle being placed in park or the engine turned off—again indicating the likelihood that at least one of the doors will be opened/closed. In other embodiments, various other inputs may be utilized to detect an upcoming stimulus event.

At step 404 a determination is made whether an impending event has been detected. If no impending event has been detected, then the method continues at step 402 with monitoring inputs for indication of a stimulus event. If an impending event has been detected, then at step 406 a message is communicated to the IMU to being collecting IMU data (assuming that the default mode is that the IMU does not continuously collect IMU data). In some embodiments, the wake-up message communicated to the IMU simply instructs the IMU to begin collecting IMU data. In some embodiments, the wake-up message communicated to the IMU may also be utilized to configure the collection of IMU data for the purpose of the IMU self-test. For example, in some embodiments, the response gain and/or bandwidth of the IMU is modified for the purpose of conducting the IMU self-test. In some embodiments, the gain and/or bandwidth are increased to provide more accurate IMU data or to detect more subtle mechanical perturbations.

At step 408, the impending stimulus event is identified. In some embodiments the identification of impending stimulus event may be based on additional information than that used at steps 402 and 404 to identify an impending stimulus. For example, the unlocking of the vehicle using a key fob is detected at steps 402 and 404 as an impending stimulation event (i.e., the opening/closing of the doors), but more information may be provided subsequently regarding which door is opened/closed. For example, in some embodiments although a door open/close event is expected and the IMU is instructed to collect IMU data, the particular stimulation event will not be identified until feedback is received from a door sensor identifying the door that has been opened/closed. At step 408, based on the identified stimulation event the expected IMU response to the stimulation event may be determined. For example, a door open/close event may be characterized by expected motion in the lateral y-direction but little to no movement in the vertical z-direction or longitudinal x-direction. In some embodiments, a door open/close event may depend on the particular door opened/closed, and therefore illustrates the importance of identifying the stimulation event and the expected IMU response.

At step 410, collected IMU data is received from the IMU that includes IMU data collected in response to the stimulation event. In some embodiments, information received indicating the precise timing of the stimulation event may be utilized to narrow the IMU data analyzed to determine IMU validity. For example, a signal received from a door sensor with a time stamp indicating the time that a door was closed may be utilized to select the IMU data corresponding with the door close stimulation event. In this case, only the IMU data corresponding with the received time stamp (or window of time surrounding the time stamp) is analyzed to determine IMU validity.

At step 412, IMU mounting integrity and IMU orientation of the IMU is determined based on the received IMU input and expected IMU response determined based on the identified stimulation event. In some embodiments, a comparison of acceleration along the longitudinal, lateral and vertical axes are compared to the expected IMU response along those axes. Likewise, a comparison of measured rotation (pitch, yaw and roll) along those axes may be compared to expected rotation. Based on the comparison the validity of one or both of the IMU mounting integrity and/or IMU orientation may be verified. At step 414, an IMU validity output is generated based on the determined validity of the IMU mounting and/or orientation.

Figure 5:
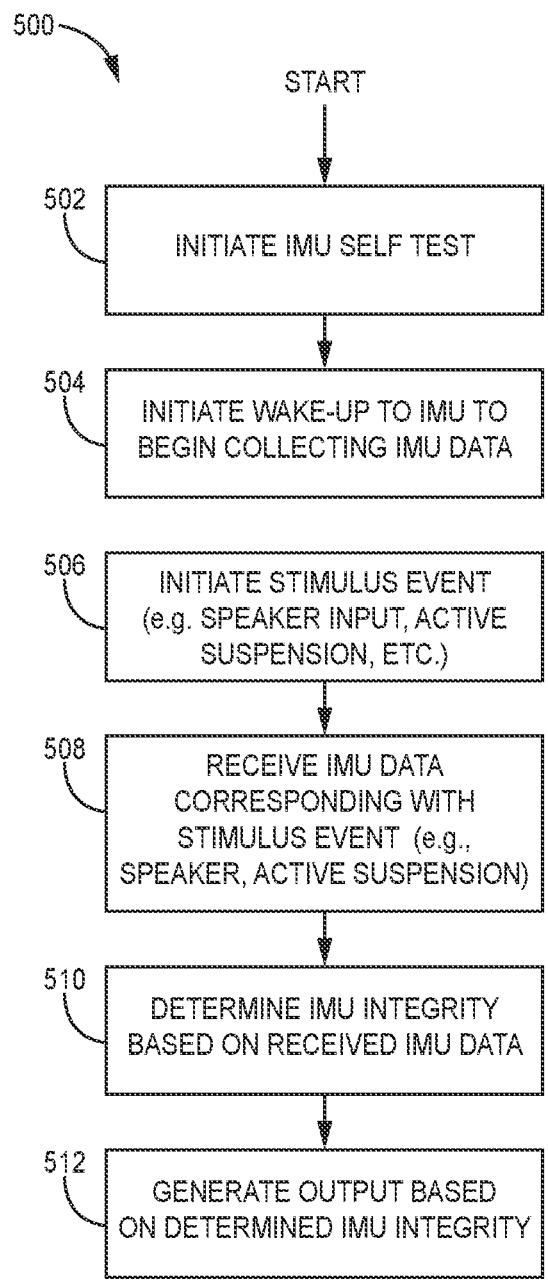
FIG. 5 is a flowchart illustrating a method of initiating an active IMU self-test according to some embodiments.

FIG. 5 is a flowchart illustrating an active method 500 of initiating an IMU self-test according to some embodiments. At step 502, the IMU self-test is initiated. In some embodiments, the self-test may be performed at defined intervals (e.g., every 500 miles, every three car trips, etc.). In some embodiments, the IMU self-test may be initiated manually by a user or mechanic.

At step 504, in response to the initiation of the IMU self-test, a wake-up message is sent to the IMU to ensure that the IMU is awake and collecting IMU data or ready to collect IMU data. In some embodiments, the wake-up message communicated to the IMU simply instructs the IMU to begin collecting IMU data. In some embodiments, the wake-up message communicated to the IMU may also be utilized to configure the collection of IMU data for the purpose of the IMU self-test. For example, in some embodiments, the response gain and/or bandwidth of the IMU is modified for the purpose of conducting the IMU self-test. In some embodiments, the gain and/or bandwidth are increased to provide more accurate IMU data or to detect more subtle mechanical perturbations.

At step 506, the stimulus event is initiated. In some embodiments, the stimulus event is created by a system located on the vehicle that is external to the IMU itself. For example, in some embodiments the mechanism for generating the stimulus event may be the speakers located within the vehicle. In some embodiments, select speakers (e.g., right, left, forward, rear) are selected and a low frequency audio signal is utilized to generate a stimulus event detectable by the IMU. In some embodiments, the mechanism for generating the stimulus event may be generated by an active suspension system. In other embodiments, other means of generating mechanical perturbations detectable by the IMU may be utilized. For example, the vehicle may be equipped with one or more solenoids and/or transducers capable of generating a mechanical perturbation detectable by the IMU.

At step 508, IMU data is received from the IMU corresponding with the stimulus event. At step 510, IMU validity is determined based on the received IMU data. In some embodiments, IMU validity includes a determination of IMU mounting validity and IMU orientation. IMU mounting validity ensures that the IMU is rigidly mounted within the vehicle. IMU orientation validity ensures that the IMU is mounted in the correct orientation within the vehicle. As discussed above, in some embodiments IMU validity is determined based on a comparison of collected IMU data to the expected IMU response. In this embodiment, because the stimulation event is actively initiated (as opposed to taking advantage of stimulation event such as doors being opened/closed), the system is aware of the identity of the stimulation event and expected IMU response.

At step 512, an output is generated based on the determined IMU validity. In some embodiments, the output is communicated or displayed to a user. In some embodiments, the output is communicated to downstream systems to prevent downstream systems from relying on faulty IMU data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

According to one aspect, a method of testing an inertial measurement unit (IMU) includes detecting a mechanical stimulation event generated external to the IMU. The method further includes receiving IMU data from the IMU that includes IMU data collected with respect to the mechanical stimulation event and determining IMU validity based on IMU data recorded in response to the mechanical stimulation event.

The method of the preceding paragraph can optionally include, additionally and/or alternatively any, one or more of the following features, configurations and/or additional components.

For example, in some embodiments detecting a mechanical stimulation event may include identifying an event type.

In some embodiments, determining IMU validity may be based on identified event type.

In some embodiments, determining IMU validity may include comparing the received IMU data with expected IMU data determined based on identified event type.

In some embodiments, stimulation events may include one or more of driver side door opening/closing, passenger side door opening/closing, and engine start.

In some embodiments, detecting a mechanical stimulation event may include detecting an imminent mechanical stimulation event.

In some embodiments, the method may further include initiating a wake-up of the IMU in response to detection of an imminent mechanical stimulation event.

In some embodiments, detecting a mechanical stimulation event generated external to the IMU may include passively detecting a mechanical stimulation event.

In some embodiments, detecting a mechanical stimulation event generated external to the IMU may include actively initiating a mechanical stimulation event.

According to another aspect, a method of self-testing an inertial measurement unit (IMU) includes initiating a mechanical stimulus external to the IMU. The method may further include receiving collected IMU data that includes IMU data collected during the mechanical stimulus and determining IMU validity based on the IMU data collected during the mechanical stimulus.

The method of the preceding paragraph can optionally include, additionally and/or alternatively any, one or more of the following features, configurations and/or additional components.

For example, in one embodiment the mechanical stimulus may include one or more of engine start, suspension activation, and speaker activation.

In some embodiments, determining IMU validity based on the IMU data collected during the mechanical stimulus may include comparing the collected IMU data to expected IMU response based on the mechanical stimulus initiated.

In some embodiments, the method may further include initiating a wake-up call to the IMU to collect IMU data.

According to another aspect, an inertial measurement unit (IMU) self-test system includes an IMU and a control circuit. In some embodiments the control circuit is configured to receive IMU data collected by the IMU and inputs from systems external to the IMU indicative of mechanical stimulus. The control circuit utilizes IMU data collected in response to the mechanical stimulus to determine IMU validity.

The system of the preceding paragraph can optionally include, additionally and/or alternatively any, one or more of the following features, configurations, and/or additional components.

For example, the inputs from systems external to the IMU may be utilized to detect impending mechanical stimulus.

In some embodiments, the control circuit may initiate a wake-up call to the IMU to begin collecting IMU data in response to a detected impending mechanical stimulus.

In some embodiments, one of the inputs from systems external to the IMU may include a key fob indicating impending door open/close events.

In some embodiments, one of the inputs from systems external to the IMU may include an engine start signal indicating an impending engine start operation.

In some embodiments, the control circuit may generate signals provided to systems external to the IMU to initiate mechanical stimulus.

The invention claimed is:

1. A method of self-testing an inertial measurement unit (IMU), the method comprising:
    detecting, by a control circuit, a mechanical stimulation event only generated external to the IMU and the control circuit;
    receiving, by the control circuit, IMU data from the IMU that includes IMU data collected with respect to the mechanical stimulation event; and
    determining, by the control circuit, IMU validity based on IMU data recorded in response to the mechanical stimulation event.

2. The method of claim 1, wherein detecting a mechanical stimulation event includes identifying an event type for the mechanical stimulation event, wherein the event type is one of a plurality of event types.

3. The method of claim 2, wherein determining IMU validity is further based on identified event type.

4. The method of claim 3, wherein determining IMU validity includes comparing the received IMU data with expected IMU data determined based on identified event type.

5. The method of claim 2, wherein event type includes one or more of driver side door opening/closing, passenger side door opening/closing, and engine start.

6. The method of claim 1, wherein detecting a mechanical stimulation event includes detecting an impending mechanical stimulation event.

7. The method of claim 6, further including initiating a wake-up of the IMU in response to detection of an impending mechanical stimulation event.

8. The method of claim 1, wherein detecting a mechanical stimulation event generated external to the IMU includes passively detecting a mechanical stimulation event.

9. The method of claim 1, wherein detecting a mechanical stimulation event generated external to the IMU includes actively initiating a mechanical stimulation event.

10. A method of self-testing an inertial measurement unit (IMU), the method comprising:
    initiating, by a control circuit, a mechanical stimulus originating external to the IMU and the control circuit;
    receiving, by the control circuit, collected IMU data that includes IMU data collected during the mechanical stimulus; and
    determining, by the control circuit, IMU validity based on the IMU data collected during the mechanical stimulus.

11. The method of claim 10, wherein the mechanical stimulus includes one or more of engine start, suspension activation, and speaker activation.

12. The method of claim 10, wherein determining IMU validity based on the IMU data collected during the mechanical stimulus includes comparing the collected IMU data to expected IMU response based on the mechanical stimulus initiated; wherein the expected IMU response is one of a plurality of expected IMU response profiles each corresponding to a possible mechanical stimulus event.

13. The method of claim 12, wherein the expected IMU response profile is modified based on previously measured IMU responses and/or an input from one or more sensors external to the IMU and the control circuit.

14. The method of claim 10, further including initiating, by the control circuit, a wake-up call to the IMU to collect IMU data before initiating the mechanical stimulus.

15. An inertial measurement unit (IMU) self-test system comprising:
    an IMU; and
    a control circuit configured to receive IMU data collected by the IMU and inputs, only from systems external to the IMU and the control circuit, indicative of mechanical stimulus, wherein the control circuit utilizes IMU data collected in response to the mechanical stimulus to determine IMU validity.

16. The IMU self-test system of claim 15, wherein the inputs from systems external to the IMU and the control circuit are utilized to detect impending mechanical stimulus.

17. The IMU self-test system of claim 16, wherein the control circuit initiates a wake-up call to the IMU to begin collecting IMU data in response to a detected impending mechanical stimulus.

18. The IMU self-test system of claim 17, wherein one of the inputs from systems external to the IMU and the control circuit includes a key fob indicating impending door open/close events.

19. The IMU self-test system of claim 16, wherein one of the inputs from systems external to the IMU and the control circuit includes an engine start signal indicating an impending engine start operation.

20. The IMU self-test system of claim 15, wherein the control circuit generates signals, provided to systems external to the IMU and the control circuit, to initiate mechanical stimulus.

* * * * *